United States Patent [19]

Hoffmann et al.

[11] Patent Number: 4,734,111
[45] Date of Patent: Mar. 29, 1988

[54] PROCESS AND APPARATUS FOR CLEANING STYRENE-POLLUTED SPENT AIR

[76] Inventors: Rainer Hoffmann, Blumenstr. 7; Günter Hanisch, Burgstr. 65, both of D-7527 Kraichtal-Menzingen, Fed. Rep. of Germany

[21] Appl. No.: 905,339

[22] PCT Filed: Dec. 12, 1985

[86] PCT No.: PCT/EP85/00696
§ 371 Date: Aug. 19, 1986
§ 102(e) Date: Aug. 19, 1986

[87] PCT Pub. No.: WO86/03689
PCT Pub. Date: Jul. 3, 1986

[30] Foreign Application Priority Data

Dec. 22, 1984 [DE] Fed. Rep. of Germany ....... 3447274

[51] Int. Cl.$^4$ ............................................. B01D 46/00
[52] U.S. Cl. ................................................ 55/97; 55/98; 55/269; 55/512; 55/90; 55/233; 55/487; 435/262; 435/264; 435/266
[58] Field of Search ............ 55/74, 90, 97, 84, 98, 55/269, 512, 487, 233; 502/7; 422/184; 435/262, 264, 266, 288, 313

[56] References Cited

U.S. PATENT DOCUMENTS

| | | | |
|---|---|---|---|
| 2,200,581 | 5/1940 | Pruss et al. | 435/266 |
| 3,216,905 | 11/1965 | Baptist | 55/74 |
| 4,045,192 | 8/1977 | Eckstein | 55/269 |
| 4,225,381 | 9/1980 | Ishikawa et al. | 210/611 |

FOREIGN PATENT DOCUMENTS

| | | | |
|---|---|---|---|
| 3227678 | 1/1984 | Fed. Rep. of Germany . | |
| 077002 | 1/1977 | Japan | 55/74 |
| 791398 | 1/1981 | U.S.S.R. | 55/84 |
| 1033542 | 8/1983 | U.S.S.R. | 435/264 |

OTHER PUBLICATIONS

Valten-Treatment of Problematic Waste Water, 1979, 35(2), pp. 138–142.

*Primary Examiner*—Bernard Nozick
*Attorney, Agent, or Firm*—Antonelli, Terry & Wands

[57] ABSTRACT

A process for cleaning in particular styrene-polluted spent air by filtering out styrene and an apparatus for performing this process are described. The filter used is a biofilter of tree bark, particularly spruce bark. The filter is in the form of a bed of particles with a particle diameter of 0.5 to 3 cm. The process is particularly inexpensive compared with the relevant prior art cleaning process working with the physical absorption of the styrene on active carbon filters.

18 Claims, 2 Drawing Figures

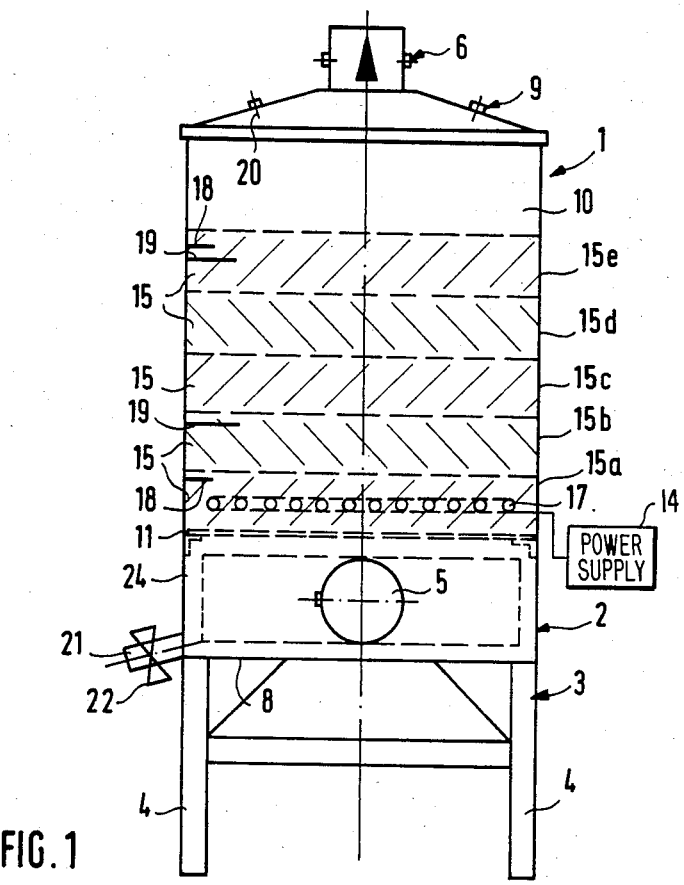
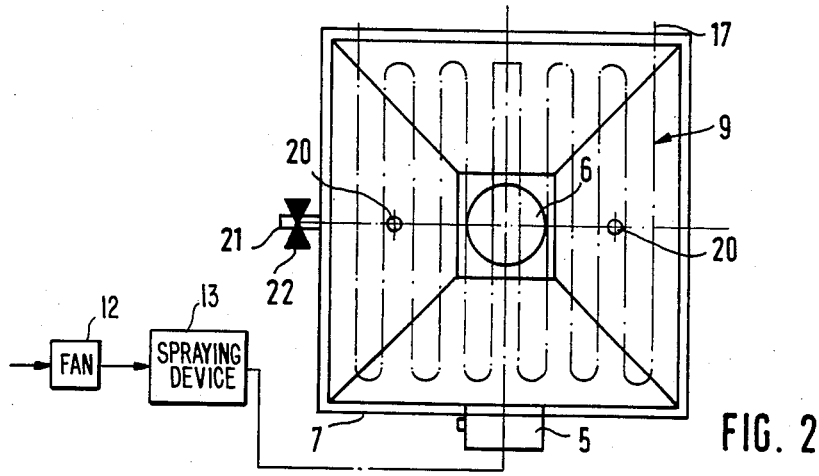
FIG. 1
FIG. 2

PROCESS AND APPARATUS FOR CLEANING STYRENE-POLLUTED SPENT AIR

The invention relates to a process and an apparatus for cleaning or purifying spent or exhaust air, which is polluted with vapours, such as solvent vapours and especially those of styrene, methylene chloride, etc. occurring during plastic processing.

Polluted spent air, such as in the form of a mixture of monostyrene and/or methylene chloride and air e.g. occurs during the production and processing of glass fibre-reinforced plastics based on unsaturated polyester resins. The spent air is distributed in the working areas and must be removed by suction and cleaned.

It is known to clean styrene-polluted spent air by the physical absorption of the styrene, specifically on active carbon filters. The spent active carbon is e.g. regenerated by means of water vapour, the styrene being chemically separated therefrom. This known spent air cleaning process and the necessary apparatus are expensive. Firstly the material costs of the active carbon are relatively high and secondly it is frequently necessary to regenerate the active carbon, which is costly to carry out, particularly due to the necessary water vapour, its production and process control requiring the use of special equipment. In another styrene-polluted spent air cleaning process, the styrene is oxidized, but this process is particularly complicated and therefore very expensive.

During the production of oil or fat in animal carcass elimination plants, it is known to remove odours by reducing the natural odorous substances formed through biological filters of compost or the like.

The problem of the present invention is to provide a process and an apparatus of the aforementioned type, which uses a simple process and apparatus, thereby permitting less expensive cleaning of spent air polluted with chemical solvents.

According to the invention, this problem is solved in that the spent air is removed by suction and humidified and is then passed through a filter of bark having microorganisms, the filter being subject to an artificial temperature control. It has surprisingly been found that the solvents are cleaned by such a filter in such a way that they are decomposed and reduced therein by bacteria and also fungal culture. It has in fact been found that the filter mass contains substantially no decomposed solvents and the like. Admittedly biofilters with refuse compost or fibrous peat - brushwood mixtures are known per se. However, they are used for avoiding smells, particularly in connection with factory farming and animal body utilization plants, as well as in refuse compost plants. The known equipment are constructed in the manner of a settler. The result achieved by the invention could not have been expected in the case of the known filtering of natural odours by such filters.

It is advantageous that the filter is less expensive than the active carbon filters hitherto used for physical absorption purposes and that the biofilter also at least partly decomposes the sorbed system under the action of the microorganisms present on the filter, so that is is much less rapidly consumed giving high retention times. Regeneration by simple aeration is possible. Thus, the costs for regeneration with water vapour are obviated. When the inexpensive filter has become used up, it is merely replaced by a new one. The spent filter can then be removed as refuse in a conventional manner.

The process according to the invention can be performed in a relatively simple apparatus having a flow-through container, in which the filter is positioned in such a way that the spent air to be cleaned flows through it. A fan is provided for the forced delivery of the spent air, whilst a sprinkler for humidifying the spent air is positioned between fan and filter. The filter has bark provided with microorganisms and a heater is provided for the temperature control of the filter. There are no means for the production and process control of water vapour.

In preferred constructions of the inventive process, spruce bark is used as the filter. A very high cleaning action is obtained with this particularly inexpensive material. The bark can be untreated, or can be pretreated, e.g. disintegrated in a way which particularly activates and propagates the naturally present microorganisms.

The tree bark is advantageously used in the form of particles arranged in a bed and in particular with a particle diameter of 0.5 to 3 cm. As a result of the spherical packing of the bed, a relatively high surface is obtained, whilst ensuring a uniform loading and aeration of the complete filter. Advantageously the tree bark is used mixed with fibrous materials, particularly brushwood. The brushwood serves to loosen the filter and helps to ensure effective aeration.

In order to aid the aerobic decomposition of the styrene and any other organic pollutants, air and/or oxygen is additionally supplied to the filter, use preferably being made of spent air already cleaned by the filter which is supplied thereto together with the still polluted spent air. This leads to a preheating of the polluted spent air and consequently to an energy saving and improved effectiveness, because the cooler spent air can be heated via a smaller temperature difference to the working temperature.

According to a particularly preferred form of the process dust is removed from the spent air before it flows through the filter. This is more particularly necessary if the process is to be used for cleaning styrene-polluted spent air resulting from the production and processing of glass fibre-reinforced plastics. The particular spent air contains glass fibre dust, which would clog the filter after a relatively short operating period.

In order to obtain a high cleaning effect, operating conditions are desired, which ensure optimum living conditions for the microorganisms. Thus, the temperature in the filter is kept above room temperature and in particular a temperature of approximately 25° to 35° C. is maintained.

Moreover, the water content in the filter is kept at between 60 aand 80%. The humidity improves the conditions for the growth of the microorganisms and contributes to the decomposition of styrene and any other pollutants.

In an embodiment of the inventive apparatus, which has a flowthrough container, in which is arranged a filter through which flows the spent air to be cleaned, the filter contains tree bark in the form of particles with a particle diameter between 0.5 and 3 cm. and the particles are arranged in a bed, the bed comprising several layers positioned successively in the flow direction and which differ as regards the particle size of the particles contained therein. In particular, adjacent layers can be made alternately coarse-grained and fine-grained.

For the exact setting of the operating temperature, the flowthrough container has a temperature sensor and a regulatable heater for the filter, which make it possible to maintain constant the operating temperature for filtering purposes. Preferably the heater is constructed as a heating coil passing through the filter.

As a result of the blower or fan the residence time can be regulated in accordance with the filter capacity, as can the pollutant contamination of the spent air. This is also appropriate for preventing drying out of the filter.

According to a preferred embodiment of the inventive apparatus in which the spent air to be cleaned flows through the filter from bottom to top, a sprinkler is arranged above the filter in the flow-through container. Humidification can also take place at other points, e.g. in the supply air, through steam supply and by spraying means. Thus, the moisture content of the filter can be adjusted. Preferably within the flow-through container and in the vicinity of the filter a moisture or humidity sensor is provided, enabling the moisture content to be accurately regulated.

Advantageously a water drain with valve is provided on the bottom of the flow-through container, so that excess water can be removed from the sprinkler, together with any condensates from the spent air. This construction also provides the possibility of washing out pollutants from the filter during operation or in a regeneration phase. The washiing medium, e.g. water can be supplied from the sprinkler.

Further advantages and features of the invention can be gathered from the following description with reference to an embodiment of the invention and the attached drawings, wherein show:

FIG. 1 A side view of the embodiment of the inventive apparatus, the inner area thereof being partly in section.

FIG. 2 A plan view of the apparatus of FIG. 1.

The embodiment of the inventive apparatus shown in the drawings has a flow-through container with a square base constructed as a standing cleaning column 1. Its bottom end 2 is mounted in a frame 3 with four legs 4. The flow-through container or column 1 is provided at the lower end 2 with an inlet connection 5 for the spent air to be cleaned and at the top an outlet connection 6 for the cleaned spent air. The inlet connection 5 is arranged on one side wall 7 of the column just above the column bottom 8. The outlet connection 6 is part of a removable cover 9, which covers the top of column 1 and is located in the vicinity of the medium longitudinal plane. Upstream of the inlet connection is provided a delivery blower or fan 12, as well as a spraying means 13 for moistening the air as shown schematically in FIG. 2.

In the interior 10 of column 1 a perforated bottom 11 is provided just above the inlet connection 5 and extends over the entire free cross-section of column 1. On perforated bottom 11 is placed a bed 15 formed from a mixture of particles of ground spruce bark and brushwood (not shown in detail in the drawings). Bed 15 fills the inner area 10 of column 1 above the perforated bottom 11 roughly to two thirds of the column height.

The bed 15 is formed from superimposed discrete layers 15a to 15e, which differ from one another as regards to the size of the particles used and namely successive layers are alternately fine-grained or coarse-grained. The diameter of the particles used is between 0.5 and 3 cm. Bed 15 with layers 15a to 15e forms a filter with several filter layers. The finer fraction has particle sizes of less than 1 cm and the coarser fraction particles of more than 2 cm.

In the interior 10 of column 1 and just above the perforated bottom 11 a heating coil 17 is embedded in the bed or filter 15, namely in the inner flow direction of the first layer 15a. The heating coil 17 is connected to a regulatable power supply unit 14 arranged outside column 1. Bed 15 contains a plurality of temperature sensors 18, which are coupled to the supply unit.

The regulatable blower in the spent air supply line, apart from feeding the spent air to be cleaned through column 1 or bed 15 can also supply the filter with unpolluted air or oxygen sucked in from the outside and blown into the supply line for aerating filter 15.

To the inside of the substantially roof gable-shaped cover 9 are fitted sprinkler nozzles 20, which are connected via connections in cover 9 to a not shown water supply unit. Humidity sensors 19 project into filter 15. In the bottom 8 of column 1 is provided a liquid drain 21 with ball valve 22 enabling the water to be removed from sprinkler 20.

A cleaning opening 24 is provided in a side wall 23 of column 1 in the area between bottom 8 and perforated bottom 11. The apparatus shown in the drawings performs the inventive process in the following way. During operation, the spent air to be cleaned flows from bottom to top through column 1. Under the action of the blower the spent air is introduced through the inlet connection 5 into the column, then flows through filter 15 and finally leaves column 1 via outlet connection 6.

On flowing through bed 15 pollutants and in particular styrene are removed from the spent air under the action of filter 15. This is due to the fact that styrene and similar pollutants are held back by the filter, not only as a result of absorption, but at least partly are decomposed under the action of the filter, in that the styrene is reduced by the microorganisms on the bark.

In order to obtain a high cleaning effect, suitable operating conditions must be maintained. The operating conditions are ultimately also responsible for setting optimum living conditions for the microorganisms.

The operating temperature is preferably above room temperature. The operating temperature is measured by means of temperature sensors 18 arranged in filter 15 and regulated by the supply unit coupled to sensors 18 and in conjunction with heating coil 17. The moisture content of filter 15 is kept between 60 and 80%. It is measured by means of moisture sensors 19 and adjusted by sprinkler 20, setting being automatic.

The residence time of the spent air in filter 15 is set by the gas flow rate, independently of the particular bed height of the filter 15. It is chosen as a function of the pollutant contamination of the spent air to be cleaned and whilst taking account of the desired degree of cleaning. Filter 15 can be simply produced without significant technical effort and expenditure. The particles can be obtained by grinding tree bark. Obviously the bark can also merely be broken up and used in lump form. The spent filter can be removed as refuse in the normal way.

We claim:

1. Process for the cleaning of spent air, which has been polluted by solvent vapours occurring during plastic processing, comprising removing the spent air by suction and humidifying the spent air and then passing the spent air through a filter of bark having microorganisms, the filter being temperature controlled to a temperature above room temperature.

2. Process according to claim 1, wherein the solvent vapours include at least one of styrene and methylene chloride.

3. Process according to claim 1, wherein spruce bark is used as the filter.

4. Process according to claim 3, wherein the tree bark is used in the form of particles arranged in a bed and having a particle diameter of 0.5 to 3 cm.

5. Process according to any one of claims 1, 3 or 4, wherein the tree bark is used in mixture with brushwood fibrous material.

6. Process according to one of claims 1 to 4, wherein the temperature is maintained at approximately 25° to 35° C.

7. Process according to any one of claims 1, 3 or 4, wherein the moisture content in the filter is measured and the humidification of the spent air supplied to the filter regulated so that the moisture content of the filter is maintained between 70 and 80%.

8. Process according to claim 1, wherein unpolluted air or oxygen is supplied to the filter.

9. Process according to claim 8, wherein spent air cleaned by the filter is returned to the filter with uncleaned spent air.

10. Apparatus for cleaning spent air polluted with solvent vapours occurring during plastic processing, comprising a flow-through container with an inlet and an outlet for the spent air, a filter between the inlet and the outlet for filtering the spent air, a fan located upstream of the filter for the forced delivery of the spent air, a spraying means positioned between the fan and the filter for humidifying the spent air, and wherein the filter includes bark provided with microorganisms and a heater for the temperature control of the filter.

11. Apparatus according to claim 10, wherein the filter contains spruce bark.

12. Apparatus according to claim 11, wherein the spruce bark is in the form of particles with a particle diameter between 0.5 and 3 cm. and the particles are arranged in a bed.

13. Apparatus according to claim 12, wherein the bed is formed from several layers arranged in succession in the flow direction and which differ as regards the particle size of the particles contained therein in such a way that a coarse fraction has particles of more than 2 cm. diameter and a fine fraction particles of less than 1 cm. diameter.

14. Apparatus according to claim 13, wherein the heater is arranged in the vicinity of a first layer of the bed in the flow direction.

15. Apparatus according to any one of the claims 10, 11, 12 or 14, wherein the flow-through container further includes a temperature sensor.

16. Apparatus according to claim 15, wherein the heater is constructed as a heating coil passing through the filter.

17. Apparatus according to claim 10 wherein a sprinkler is arranged in the flow-through container above the filter.

18. Apparatus according to claim 17, wherein a humidity sensor is arranged in the interior of the flow-through container in the filter.

* * * * *

UNITED STATES PATENT AND TRADEMARK OFFICE
CERTIFICATE OF CORRECTION

PATENT NO. : 4,734,111
DATED : March 29, 1988
INVENTOR(S) : Rainer HOFFMANN and Gunter HANISCH It is certified that error appears in the above-identified patent and that said Letters Patent is hereby corrected as shown below:

On the Cover Page:   The assignee should appear as:

--Menzolit-Werke Albert Schmidt GmbH & Co. KG--.

Signed and Sealed this

Twentieth Day of December, 1988

Attest:

DONALD J. QUIGG

*Attesting Officer*   Commissioner of Patents and Trademarks